E. BALL.
Vehicle-Wheel Tire.

No. 168,211.  Patented Sept. 28, 1875.

WITNESSES  INVENTOR
Ephraim Ball,
per
Alexander T Mason
Attorneys

UNITED STATES PATENT OFFICE.

EPHRAIM BALL, OF CLARKSVILLE, TENNESSEE, ASSIGNOR TO THE CLARKSVILLE IRON WAGON MANUFACTURING COMPANY, OF SAME PLACE.

IMPROVEMENT IN VEHICLE-WHEEL TIRES.

Specification forming part of Letters Patent No. 168,211, dated September 28, 1875; application filed March 6, 1875.

*To all whom it may concern:*

Be it known that I, EPHRAIM BALL, of Clarksville, in the county of Montgomery and in the State of Tennessee, have invented certain new and useful Improvements in Tires for Iron Wheels; and do hereby declare that the following is a full, clear, and exact description thereof, reference being had to the accompanying drawings and to the letters of reference marked thereon, making a part of this specification.

The nature of my invention consists in the construction of a tire for wheels, as will be hereinafter more fully set forth.

In order to enable others skilled in the art to which my invention appertains to make and use the same, I will now proceed to describe its construction and operation, referring to the annexed drawing, in which—

Figure 1:
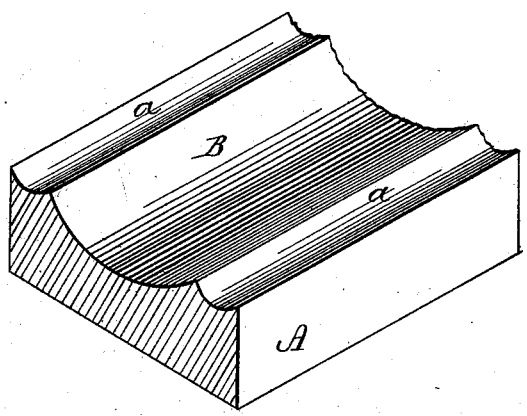
Figure 2:
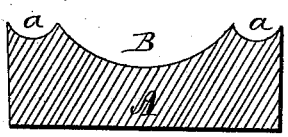

Figure 1 is a perspective view of my tire, and Fig. 2 is a cross-section of the same.

A represents a section of a tire for iron wheels, made of any suitable width. On the inner side of the tire, along each edge, is a groove, $a$, of suitable depth. These grooves are designed to be shrunk onto the edge of a hollow felly, holding securely and strengthening the same.

The under side of the tire is hollowed out between the grooves $a\,a$, as shown at B, thereby securing lightness. This does not impair the usefulness of the tire, nor lessen the time it can be worn, as the tire always wears rounding on the face.

I do not broadly claim a tire having side grooves on its under face, as I am aware that such is not new.

Having thus fully described my invention, what I claim as new, and desire to secure by Letters Patent, is—

The tire A, having an outer flat surface, an inner hollowed-out center, B, and longitudinal grooves $a\,a$ each side thereof, as shown and described.

In testimony that I claim the foregoing I have hereunto set my hand this 30th day of January, 1875.

EPHRAIM BALL.

Witnesses:
A. HOWELL,
G. L. ALLEY.